US012732451B2

(12) United States Patent
Wang

(10) Patent No.: US 12,732,451 B2
(45) Date of Patent: Sep. 8, 2026

(54) DATA PACKET SENDING METHOD AND DEVICE

(71) Applicant: Huawei Technologies Co., Ltd., Shenzhen (CN)

(72) Inventor: Jiabing Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 18/477,149

(22) Filed: Sep. 28, 2023

(65) Prior Publication Data

US 2024/0022501 A1 Jan. 18, 2024

Related U.S. Application Data

(63) Continuation of application No. PCT/CN2022/082229, filed on Mar. 22, 2022.

(30) Foreign Application Priority Data

Mar. 31, 2021 (CN) ........................ 202110352350.4

(51) Int. Cl.
*H04L 45/02* (2022.01)
*H04L 45/17* (2022.01)
*H04L 45/24* (2022.01)

(52) U.S. Cl.
CPC .............. *H04L 45/17* (2022.05); *H04L 45/02* (2013.01); *H04L 45/24* (2013.01)

(58) Field of Classification Search
CPC .......... H04L 45/17; H04L 45/02; H04L 45/24
USPC .......................................................... 709/238
See application file for complete search history.

(56) References Cited

U.S. PATENT DOCUMENTS 8,824,274 B1 * 9/2014 Medved ................. H04L 45/02 370/217
2003/0035424 A1 2/2003 Abdollahi et al.
2018/0331891 A1 11/2018 Zhao
2020/0119979 A1 * 4/2020 Woodland ............. H04L 41/082
2020/0120020 A1 * 4/2020 Dutta ...................... H04L 45/04

FOREIGN PATENT DOCUMENTS

CN 107682197 A 2/2018
CN 108259215 A 7/2018

* cited by examiner

*Primary Examiner* — Ario Etienne
*Assistant Examiner* — Kidest Mendaye
(74) *Attorney, Agent, or Firm* — Conley Rose, P.C.

(57) ABSTRACT

A data packet sending method includes determining a data packet set corresponding to each network device in a plurality of network devices, where the data packet set includes one or more data packets that need to be used by the corresponding network device, and data packet sets are not the same; generating a plurality of correspondences based on the data packet sets of the plurality of network devices, where the correspondence is a correspondence between a data packet group and a network device group, the network device group includes one or more network devices, and the data packet group includes data packets that need to be used by all network devices in the network device group; and sending the corresponding data packet group to the network devices in the network device group based on the correspondence.

20 Claims, 5 Drawing Sheets

DATA PACKET SENDING METHOD AND DEVICE

CROSS-REFERENCE TO RELATED APPLICATIONS

This application is a continuation of International Patent Application No. PCT/CN2022/082229 filed on Mar. 22, 2022, which claims priority to Chinese Patent Application No. 202110352350.4 filed on Mar. 31, 2021. The disclosures of the aforementioned applications are hereby incorporated by reference in their entireties.

TECHNICAL FIELD

The present disclosure relates to the field of communication technologies, and in particular, to a data packet sending method and a device.

BACKGROUND

A network device, for example, a router or a switch, is responsible for forwarding packets and other functions in a network system. With upgrading of a network, tasks that the network device needs to perform become more complex, and consequently a conventional network device cannot meet increasing service requirements. Therefore, to meet the service requirements, dedicated software or applications (APPs) may be installed on the network device, to complete specific tasks by using the software or the applications.

Similar to software or applications installed on a computer device such as a personal computer (PC) or a mobile phone, the software or the applications installed on the network device may also need to be upgraded. However, different from the computer device such as the personal computer, the network device may not be able to download data packets for upgrading the software or the applications directly from the network. Therefore, to upgrade the software or the applications installed on the network device, a control device in the network system may send data packets to the network device through a connection between the control device and the network device. After receiving the data packets, the network device may upgrade the software or the applications by using the data packets.

However, in a conventional data packet sending method, the control device can only send a same data packet to a plurality of network devices. This cannot meet a requirement that different network devices use different data packets.

SUMMARY

Embodiments of the present disclosure provide a data packet sending method and a device, to group a plurality of network devices into a plurality of network device groups based on required data packets, and send data packets required by the network device groups to the network device groups, so that the network devices can obtain the required data packets.

According to a first aspect, a data packet sending method is provided. The method is applied to a control device, and the control device is a device that is in a network system and that is configured to control and manage other network devices. The method includes the following steps. The control device first determines one or more data packets that need to be used by a network device in a plurality of network devices, where the one or more data packets are a data packet set corresponding to the network device. Because the data packets required by the network device may be different, data packet sets corresponding to any two network devices in the plurality of network devices may not be entirely the same. After determining the data packet set, the control device may generate a plurality of correspondences based on data packet sets of the plurality of network devices, where the correspondence is a correspondence between a data packet group and a network device group. The network device group includes one or more network devices in the foregoing plurality of network devices, and the data packet group includes one or more data packets. A data packet set of any network device in the network device group corresponding to the data packet group includes a data packets. In other words, a data packet group corresponding to a network device group includes data packets that need to be used by network devices. After determining the correspondence, the control device may send the data packet group corresponding to the network device group to the network devices in the network device group based on the correspondence. In this way, because the data packets included in the data packet group is the data packets that need to be used by the network devices in the network device group, the corresponding data packet group is sent to the network devices based on the correspondence, so that the network devices can receive the data packets required by the network devices. In this way, the control device may determine, in an upgrade task, data packets required by each network device, and specify data packets that need to be obtained by each network device, to send data packets required by different network devices to the different network devices.

That the control device sends the corresponding data packet group to the network devices based on the correspondence may be implemented in the following two possible implementations.

Implementation 1: The control device sends the data packet group corresponding to the network device group to each network device in the network device group based on the correspondence.

Implementation 2: The control device sends the data packet group corresponding to the network device group to a network device in the network device group based on the correspondence.

The foregoing two possible implementations do not constitute a limitation on embodiments of the present disclosure, and a person skilled in the art may design based on an actual situation.

In a possible design, before the control device sends the data packet group to a network device in the network device group, the control device may first determine a forwarding path. The forwarding path indicates a sequence in which the data packet group is transmitted among the network devices in the network device group. Specifically, the control device may first determine the forwarding path of the data packet group based on network topology information of the network devices in the network device group, and then send information about the forwarding path and the data packet group corresponding to the network device group to a first network device on the forwarding path. The information about the forwarding path may be used by network devices on the forwarding path to forward the data packet group. In this way, after receiving the data packet group and the information about the forwarding path, the first network device on the forwarding path may send the data packet group to a next-hop network device along the forwarding path, to ensure that the data packet group can be transmitted along the forwarding path.

In a possible design, the control device may first determine the first network device on the forwarding path when determining the forwarding path. When determining the first network device, the control device may first determine one or more network devices in the network device group as candidate devices based on hop counts between the network devices in the network device group and the control device. For example, a network device in which a hop count is less than a preset value may be determined as a candidate device. Then, the control device may select a network device from the determined one or more candidate devices as the first network device, and then determine the forwarding path of the data packet group based on the first network device and network topology information of other network devices in the network device group.

In a possible design, when the control device determines a plurality of candidate devices, the control device may determine the first network device based on reference information of the candidate devices. Specifically, the control device may first obtain reference information of each candidate device in the plurality of candidate devices, where the reference information may reflect a working status of the candidate device. Then, the control device may determine a most suitable candidate device from the plurality of candidate devices as the first network device based on the reference information of each candidate device. In this way, a distance between a network device and the control device, namely, a hop count between the network device and the control device, is considered, and an actual working status of the network device is also considered, so that a finally obtained first network device is the most suitable network device in the network device group, thereby improving forwarding efficiency of the data packet group.

In a possible design, the control device may obtain the reference information of the candidate device by using a packet. For example, the candidate device may send a packet to the control device based on Network Configuration Protocol (NETCONF) or Simple Network Management Protocol (SNMP), where the packet carries the reference information of the candidate device.

In a possible design, the reference information of the candidate device may include performance information of the candidate device, a hop count between the candidate device and the control device, a maximum quantity of fragments supported by the candidate device, and a miss rate of the candidate device. The performance information of the candidate device may include, for example, information such as memory usage and bandwidth usage of the candidate device, to describe a working status of the candidate device. The maximum quantity of fragments supported by the candidate device indicates a maximum quantity of data packet subgroups which the candidate device can split each data packet into when forwarding the data packet group. The miss rate of the candidate device is a probability that the candidate device is not selected as the first network device in each historical data packet group sending process.

In a possible design, the first network device on the forwarding path may determine, based on the information about the forwarding path sent by the control device, a next-hop network device corresponding to the first network device on the forwarding path, to forward the data packet group to the next-hop network device. In other words, the information about the forwarding path is used by the first network device to forward the data packet group to the next-hop network device on the forwarding path.

In a possible design, in addition to the first network device, the control device may further send the information about the forwarding path to other network devices on the forwarding path, in other words, the control device may send the information about the forwarding path to each network device on the forwarding path.

In a possible design, the control device sends the information about the forwarding path to the first network device on the forwarding path based on a Path Computation Element Protocol (PCEP).

In a possible design, the control device may first fragment the one or more data packets included in the data packet group, and then send the fragmented data packet group to the network devices in the network device group. By using an example in which the data packet group includes a first data packet group and the first data packet group corresponds to a first network device group, before the control device sends the first data packet group to network devices in the first network device group, the control device may first fragment the first data packet group to obtain a plurality of first data packet subgroups. Then, the control device may send the plurality of first data packet subgroups to the network devices in the first network device group in sequence or in parallel. In this way, when a size of a data packet is large, the large data packet may be split into a plurality of fragmented data packets, thereby improving sending efficiency of the data packet.

In a possible design, the control device may send, based on a File Transfer Protocol (FTP) or a Secure File Transfer Protocol (SFTP), the corresponding data packet group to the network devices in the network device group based on the correspondence.

In a possible design, the forwarding path includes a shortest path from the first network device to the other network devices in the network device group.

In a possible design, the data packet is an APP, a software version, or a patch of a software version.

According to a second aspect, an embodiment of the present disclosure provides a data packet sending method. The method is applied to a first network device, and the first network device is a network device that needs data packets in a network system. The method includes the following steps. The first network device first receives a first data packet group from a first device, and obtains information about a forwarding path of the first data packet group. The first data packet group includes one or more data packets. The information about the forwarding path may indicate a network device to which the first network device needs to send the first data packet group, for example, may indicate that a next-hop network device is a second network device. Then, the first network device may copy the first data packet group to obtain a second data packet group, and send the second data packet group to the second network device based on the information about the forwarding path. The first device may be a control device or a third network device, and the information about the forwarding path is determined by a control device in the network system. In this way, any network device in a network device group may send a data packet group to a next-hop network device corresponding to the network device based on information about a forwarding path, so that each network device in the network device group can receive required data packets. In this way, the control device may determine, in an upgrade task, data packets required by each network device, and specify data packets that need to be obtained by each network device, to send data packets required by different network devices respectively to the different network devices, so that the network devices update software or an application based on the data packets required by the network devices respectively.

The first network device may belong to a network device group corresponding to the first data packet group, or may not belong to the network device group corresponding to the first data packet group. Correspondingly, after a first data packet is received, if the first data packet belongs to the network device group corresponding to the first data packet group, the first network device may cache the first data packet group, to update software or an application based on the first data packet group. If the first data packet does not belong to the network device group corresponding to the first data packet group, the first network device may directly send the data packet group to the second network device without caching the first data packet group.

In a possible design, the first network device may receive the information about the forwarding path of the first data packet group from a control device or the first device. The first device may be a control device or a third network device. Optionally, when the first network device is a first network device on the forwarding path, the first network device may receive the information about the forwarding path from the control device. When the first network device is not the first network device on the forwarding path and the control device sends the information about the forwarding path to each network device on the forwarding path, the first network device may receive the information about the forwarding path from the control device. When the first network device is not the first network device on the forwarding path and the control device sends the information about the forwarding path to only the first network device on the forwarding path, the control device may receive the information about the forwarding path from the third network device. The third network device may be a previous-hop network device of the first network device.

In a possible design, the first network device may receive the information about the forwarding path of the first data packet group from the control device based on a PCEP.

In a possible design, the first network device may receive the first data packet group from the first device based on an FTP or an SFTP.

In a possible design, before the sending the second data packet group to the second network device, the first network device may first fragment the second data packet group to obtain a plurality of second data packet subgroups. Then, the first network device may send the plurality of second data packet subgroups to the second network device in sequence or in parallel based on the information about the forwarding path.

In a possible design, the first device is the control device or a third network device.

In a possible design, the information about the forwarding path includes an internet protocol IP address of the next-hop network device, a label of the next-hop network device, or a segment identifier of the next-hop network device.

According to a third aspect, an embodiment of the present disclosure provides a control device, used in a network system that includes a control device and a plurality of network devices, where the control device is the control device in the network system, and the control device includes: a processing unit configured to determine a data packet set corresponding to each network device in the plurality of network devices, where the data packet set includes one or more data packets that need to be used by the corresponding network device, and data packet sets corresponding to the plurality of network devices are not entirely the same; and generate a plurality of correspondences based on the data packet sets of the plurality of network devices, where the correspondence is a correspondence between a data packet group and a network device group, the network device group includes one or more network devices in the plurality of network devices, and the data packet group includes data packets that need to be used by all network devices in the network device group; and a sending unit configured to send the corresponding data packet group to the network devices in the network device group based on the correspondence.

In a possible design, the processing unit is configured to determine a forwarding path of the data packet group based on network topology information of the network devices in the network device group; and the sending unit is configured to send information about the forwarding path and the corresponding data packet group to a first network device on the forwarding path, where the information about the forwarding path is used by network devices on the forwarding path to forward the data packet group.

In a possible design, the processing unit is configured to determine one or more network devices in the network device group as candidate devices based on hop counts between the network devices and the control device; determine the first network device from the one or more candidate devices; and determine the forwarding path of the data packet group based on the first network device and network topology information of other network devices in the network device group.

In a possible design, there are a plurality of candidate devices; and the processing unit is configured to obtain reference information of each candidate device in the plurality of candidate devices; and determine the first network device from the plurality of candidate devices based on the reference information of each candidate device.

In a possible design, the processing unit is configured to receive a packet of each candidate device in the plurality of candidate devices, where the packet is a packet based on a NETCONF protocol or a packet based on a simple network management protocol SNMP, and the packet carries the reference information of the network device.

In a possible design, the reference information includes one or more of the following: performance information of a network device, a hop count from the control device, a maximum quantity of supported fragments, and a miss rate, where the miss rate is a probability that the network device is not selected as the first network device.

In a possible design, the information about the forwarding path is used by the first network device to forward the data packet group to a next-hop network device on the forwarding path.

In a possible design, the sending unit is further configured to send the information about the forwarding path to other network devices on the forwarding path.

In a possible design, the sending unit is configured to send the information about the forwarding path to the first network device on the forwarding path based on a path computation element protocol PCEP.

In a possible design, the information about the forwarding path includes an internet protocol IP address of the next-hop network device, a label of the next-hop network device, or a segment identifier of the next-hop network device.

In a possible design, the data packet group includes a first data packet group, and a network device group corresponding to the first data packet group is a first network device group; the processing unit is configured to fragment the first data packet group to obtain a plurality of first data packet subgroups; and the sending unit is configured to send the plurality of first data packet subgroups to network devices in the first network device group in sequence or in parallel.

In a possible design, the sending unit is configured to send, based on a file transfer protocol FTP or a secure file transfer protocol SFTP, the corresponding data packet group to the network devices in the network device group based on the correspondence.

In a possible design, the forwarding path includes a shortest path from the first network device to the other network devices in the network device group.

In a possible design, the data packet is an application APP, a software version, or a patch of a software version.

According to a fourth aspect, an embodiment of the present disclosure provides a network device, used in a network system that includes a plurality of network devices, where the plurality of network devices include a first network device, a second network device, and a first device, the network device is the first network device, and the network device includes: a receiving unit configured to receive a first data packet group from the first device, and obtain information about a forwarding path of the first data packet group, where the information about the forwarding path indicates that a next-hop network device of the first network device is the second network device, and the first data packet group includes one or more data packets; a processing unit configured to copy the first data packet group to obtain a second data packet group; and a sending unit configured to send the second data packet group to the second network device based on the information about the forwarding path.

In a possible design, the network system further includes a control device; and the receiving unit is configured to receive the information about the forwarding path of the first data packet group from the control device or the first device.

In a possible design, the receiving unit is configured to receive the information about the forwarding path of the first data packet group from the control device based on a path computation element protocol PCEP.

In a possible design, the receiving unit is configured to receive the first data packet group from the first device based on a file transfer protocol FTP or a secure file transfer protocol SFTP.

In a possible design, the processing unit is configured to fragment the second data packet group to obtain a plurality of second data packet subgroups; and the sending unit is configured to send the plurality of second data packet subgroups to the second network device in sequence or in parallel based on the information about the forwarding path.

In a possible design, the first device is the control device or a third network device.

In a possible design, the information about the forwarding path includes an internet protocol IP address of the next-hop network device, a label of the next-hop network device, or a segment identifier of the next-hop network device.

According to a fifth aspect, a device is provided, used in a network system that includes a plurality of devices, where the plurality of devices includes a control device and a network device, the device is a control device, and the control device includes a processor and a network interface. The network interface is for receiving and sending packets. The processor is configured to perform the method in the first aspect or any one of the possible designs of the first aspect.

In a possible design, the control device further includes a memory, and the memory may be configured to store instructions or program code. The processor is configured to invoke the instructions or the program code in the memory to perform the method in the first aspect or any one of the possible designs of the first aspect.

According to a sixth aspect, a device is provided, used in a network system that includes a plurality of devices, where the plurality of devices includes a control device and a network device, the device is a network device, and the network device includes a processor and a network interface. The network interface is for receiving and sending packets. The processor is configured to perform the method in the second aspect or any one of the possible designs of the second aspect.

In a possible design, the network device further includes a memory, and the memory may be configured to store instructions or program code. The processor is configured to invoke the instructions or the program code in the memory to perform the method in the second aspect or any one of the possible designs of the second aspect.

According to a seventh aspect, a network system is provided. The network system includes the control device according to the third aspect and the network device according to the fourth aspect, or includes the control device according to the fifth aspect or the network device according to the sixth aspect.

According to an eighth aspect, a computer-readable storage medium is provided, including instructions, a program, or code. When the instructions, the program, or the code are/is executed on a computer, the computer is enabled to perform the method according to any one of possible implementations of the first aspect or the second aspect.

According to a ninth aspect, a computer program product including computer instructions is provided. When the computer program product is run on a network device, the network device is enabled to perform the method according to any one of possible implementations of the first aspect or the second aspect.

According to a tenth aspect, a chip is provided, including a memory and a processor. The memory is configured to store instructions or program code. The processor is configured to invoke and run the instructions or the program code from the memory, to perform the method in the first aspect or any one of the possible designs of the first aspect, or perform the method in the second aspect or any one of the possible designs of the second aspect.

According to an eleventh aspect, a chip is provided. The chip includes a processor but does not include a memory. The processor is configured to read and execute instructions or program code stored in the memory outside the chip, and when the instructions or the program code are/is executed, the processor performs the method in the first aspect or any one of the possible designs of the first aspect, or performs the method in the second aspect or any one of the possible designs of the second aspect.

DESCRIPTION OF EMBODIMENTS

The following describes conventional technologies and a data packet sending method provided in embodiments of the present disclosure with reference to accompanying drawings.

Figure 1:
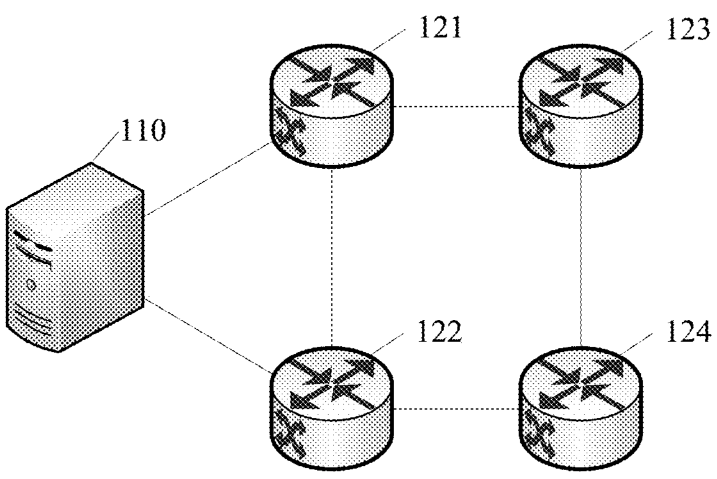
FIG. 1 is a schematic diagram of a structure of a network system according to an embodiment of the present disclosure.

FIG. 1 is a schematic diagram of a structure of a network system 100. The network system 100 may include a control device 110, a network device 121, a network device 122, a network device 123, and a network device 124. The control device 110 is separately connected to the network device 121 and the network device 122, the network device 121 is separately connected to the network device 122 and the network device 123, and the network device 123 is separately connected to the network device 121 and the network device 124. Software or an application may be installed on the network device 121, the network device 122, the network device 123, and the network device 124, to perform a corresponding task by running the software or the application.

In the conventional technologies, when a network device needs to update software or an application that has been installed, or needs to install new software or a new application, a control device may create an upgrade task, where the upgrade task corresponds to one or more network devices that require data packets. The control device may send the data packets to the one or more network devices based on the upgrade task, so that after receiving the data packets, the network devices upgrade, by using the data packets the software or the application that has been installed, or install the new software or the new application.

For example, it is assumed that software A that is installed on the network device 121, the network device 122, the network device 123, and the network device 124 needs to be upgraded. In this case, the control device 110 may create an upgrade task for the software A, and send, to the network devices through a network connection, data packets required for upgrading the software A. After receiving the data packets sent by the control device 110, the network devices may upgrade the software A based on the data packets.

However, the method is applicable only to a case in which the data packets required by each network device are the same. If data packets required by different network devices are different, because the control device can specify only data packets that need to be jointly downloaded by the network devices in an upgrade task, and cannot send different data packets to different network devices in an upgrade task, the network devices cannot obtain the data packets required by the network devices.

For example, it is assumed that the network device 121 and the network device 123 need a data packet M and a data packet N to upgrade the software, and the network device 122 and the network device 124 need the data packet M and a data packet X to upgrade the software. In this case, because the control device 110 cannot send different data packets to different network devices, it is possible that one or more network devices of the network device 121, the network device 122, the network device 123, and the network device 124 cannot receive the required data packets. As a result, the software or an application in the network devices cannot be upgraded.

To resolve the foregoing technical problems, an embodiment of the present disclosure provides a data packet sending method. The method may be applied to a network system that includes a control device. The control device may group a plurality of network devices into a plurality of network device groups based on required data packets, and send data packets required by the network device groups to the network device groups, so that the control device can send data packets required by specific network devices to the specific network devices in an upgrade task, so that the network devices can obtain the required data packets.

It should be noted that, the data packets mentioned in embodiments of the present disclosure may be update data packets, version data packets, or patch data packets of software or an application, or may be files or folders required by the network devices. Specific content of the data packets is not limited in this embodiment of the present disclosure.

The method provided in this embodiment of the present disclosure may be applied to a network architecture shown in FIG. 1. The network device 121, the network device 122, the network device 123, and the network device 124 may be entity devices that support a routing function, such as a router and a switch, or may be servers on which a virtual router or a virtual switch is deployed, to transmit packets in the network system, or transmit data packets or a forwarding path sent by the control device. The control device 110 may be a network management device or a controller.

Figure 2:
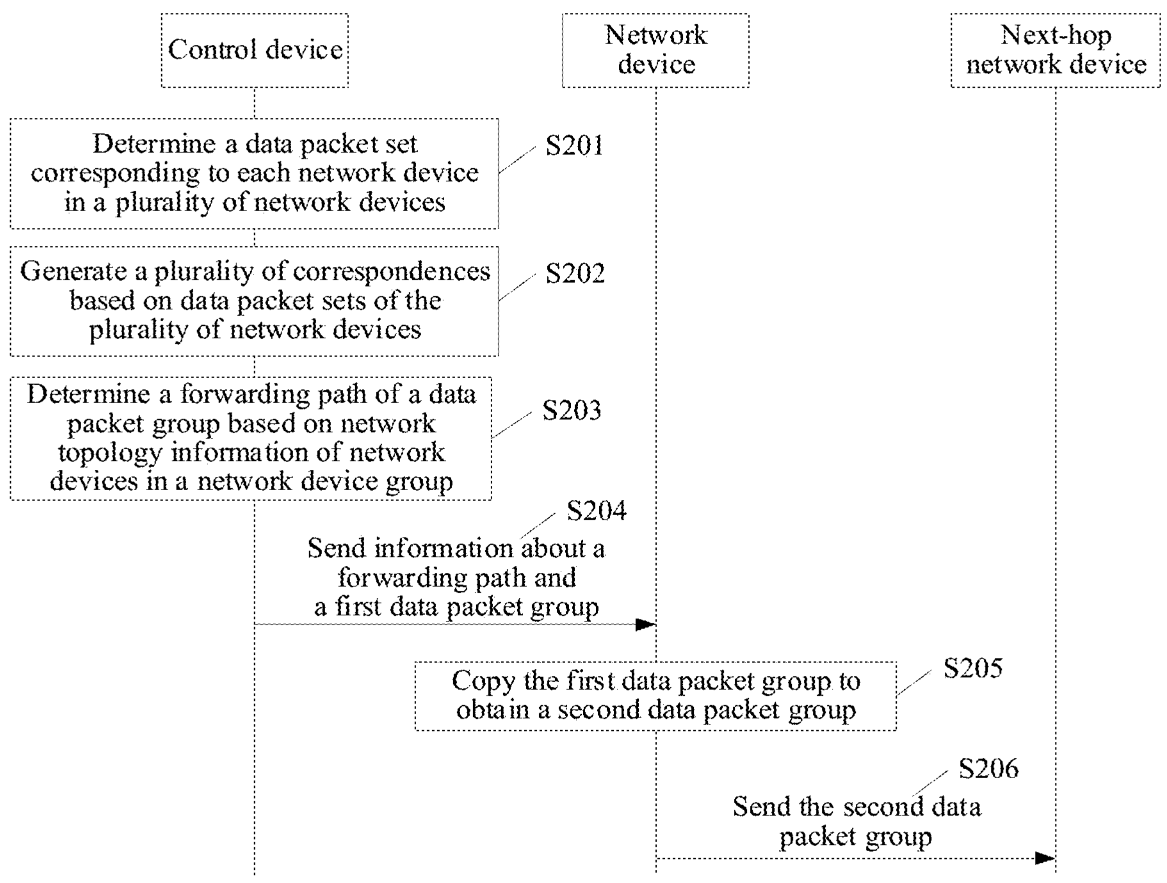
FIG. 2 is a diagram of signaling interaction of a data packet sending method according to an embodiment of the present disclosure.

FIG. 2 is a schematic diagram of interaction of a data packet sending method according to an embodiment of the present disclosure. The data packet sending method provided in this embodiment of the present disclosure includes the following steps.

S201: A control device determines a data packet set corresponding to each network device in a plurality of network devices.

Before sending data packets, the control device may first determine the data packet set corresponding to each network device in the plurality of network devices. The control device may be the control device 110 in the embodiment shown in FIG. 1, and the plurality of network devices may include the network device 121, the network device 122, the network device 123, and the network device 124 in the embodiment shown in FIG. 1. A data packet set corresponding to a network device may include one or more data packets required by the network device. For example, it is assumed that the network device 121 needs a data packet M and a data packet N. In this case, a data packet set corresponding to the network device 121 may include the data packet M and the data packet N.

Optionally, the data packets may be version data packets or patch data packets of an application or software. The version data packets may be for upgrading a version of the application or the software, and the patch data packets may be for repairing a fault or a vulnerability of the application or the software.

In this embodiment of the present disclosure, data packet sets corresponding to different network devices may be different. For example, the data packet set corresponding to the network device 121 may include the data packet M and the data packet N, and a data packet set corresponding to the network device 122 may include a data packet X and the data packet M. The data packet set corresponding to each network device in the plurality of network devices may be configured by a skilled person in the control device.

S202: The control device generates a plurality of correspondences based on data packet sets of the plurality of network devices.

After determining the data packet set corresponding to each network device in the plurality of network devices, the control device may generate a correspondence of each network device in the plurality of network devices based on the data packet set, where the correspondence is a correspondence between a data packet group and a network device group.

The network device group may include one or more network devices. The data packet group may include one or more data packets, and the one or more data packets are data packets required by all network devices in the network device group corresponding to the data packet group. Optionally, different network device groups may include a same network device. For example, it is assumed that the network device 121 and the network device 123 need the data packet M and the data packet N. In this case, the control device may group the network device 121 and the network device 123 into one network device group, and a data packet group corresponding to the network device group may include the data packet M and the data packet N.

Certainly, in this embodiment of the present disclosure, there may be a plurality of methods for dividing a data packet group and a network device group. For example, the network device 121, the network device 122, the network device 123, and the network device 124 each need the data packet M. Therefore, the network device 121, the network device 122, the network device 123, and the network device 124 are grouped into one network device group, and a data packet group corresponding to the network device group may include the data packet M.

When generating a correspondence, the control device may analyze the data packet sets of the plurality of network devices, group network devices whose data packet sets include same data packets into one network device group, and then select the same data packets from the data packet sets corresponding to the network devices in the network device group as a data packet group corresponding to the network device group, to obtain a correspondence between the network device group and the data packet group.

After obtaining the correspondence between the network device group and the data packet group, the control device may send the corresponding data packet group to the network devices in the network device group. In a possible implementation, the control device may separately send the data packet group to each network device in the network device group.

In some other possible implementations, the control device may send the data packet group to a network device in the network device group, and then the network device forwards the data packet group to other network devices. Optionally, the control device may send the data packet group to any network device in the network device group, and then the network device forwards the data packet group to other network devices in the network device group.

In this embodiment of the present disclosure, the control device may further determine a most suitable forwarding path based on information about the network devices in the network device group, and then send the data packet group based on the forwarding path, thereby improving forwarding efficiency of the data packet group. The method is described in detail below.

S203: The control device determines a forwarding path of the data packet group based on network topology information of the network devices in the network device group.

Before sending the data packet group to the network devices in the network device group, the control device may first determine the forwarding path of the data packet group based on the network topology information of the plurality of network devices in the network device group. The network topology information indicates a connection relationship among the network devices in the network system, and the forwarding path is a sequence in which the data packet group arrives at the network devices in the network device group. Optionally, the control device may obtain the network topology information by receiving packets sent by the network devices, or may receive the network topology information manually set by a skilled person.

When determining the forwarding path based on the network topology information, the control device may first determine a first network device on the forwarding path, namely, a first network device that receives the data packet group sent by the control device. In this embodiment of the present disclosure, the control device may determine the first network device on the forwarding path from the network devices in the network device group in two different manners. The following describes the two manners respectively.

In a first possible implementation, the control device may determine a network device that is in the network device group and that is closest to the control device as the first network device on the forwarding path. A distance between a network device and the control device may be a hop count between the control device and the network device, namely, a minimum quantity of network devices that need to be passed through in a process in which a packet is transmitted from the control device to the network device. In this case, when determining the first network device on the forwarding path, the control device may determine a network device with a smallest hop count as the first network device on the forwarding path.

The network system 100 shown in FIG. 1 is used as an example for description. If a packet sent by the control device 110 needs to pass through one network device (namely, the network device 121) when being transmitted to the network device 121, a hop count between the control device 110 and the network device 121 may be 1. However, if the packet sent by the control device 110 needs to pass through two network devices (namely, the network device 121 and the network device 123) when being transmitted to the network device 123, a hop count between the control device 110 and the network device 123 may be 2. In this case, the control device may select the network device 121 with a smaller hop count as the first network device on the forwarding path.

In a second possible implementation, the control device may first select one or more network devices from the plurality of network devices in the network device group as candidate devices, and then determine the first network device on the forwarding path from the candidate devices. Optionally, the control device may determine the candidate devices based on hop counts between the network devices and the control device. For example, the control device may use a network device in which a hop count between the network device and the control device is less than or equal to a preset threshold as a candidate device, or may use m network devices in which hop counts are smallest as candidate devices, where m is a positive integer greater than or equal to 1.

When there is one candidate device, the control device may determine the candidate device as the first network device on the forwarding path. When there is a plurality of candidate devices, the control device may further determine the first network device from such candidate devices.

In this embodiment of the present disclosure, the control device may determine the first network device based on reference information of each candidate device in the plurality of candidate devices. The reference information of the candidate device may reflect a data packet transmission capability of the candidate device. Optionally, the reference information of the candidate device may include any one or more of information such as performance information of the candidate device, a hop count between the candidate device and the control device, a maximum quantity of fragments supported by the candidate device, and a miss rate of the candidate device. The performance information of the candidate device may include information such as a central processing unit (CPU) idle rate of the candidate device, a memory idle rate of the candidate device, and a bandwidth idle rate of the candidate device. Fragmentation refers to splitting one data packet into a plurality of data fragments and transmitting the data fragments in sequence or in parallel. The maximum quantity of fragments supported by the candidate device means that the candidate device can split one data packet into a maximum quantity of data fragments for transmission. For description of fragmentation, refer to S204. The miss rate of the candidate device is a probability that the candidate device is not selected as the first network device in a past data packet transmission process. For example, it is assumed that the control device 110 sends a data packet four times in total, and the network device 121 serves as the first network device on the forwarding path thrice. In this case, a miss rate of the network device 121 is that ¾=75%.

Before determining the first network device based on the reference information, the control device may first obtain the reference information of each candidate device in the plurality of candidate devices. Optionally, the candidate device may include the reference information of the candidate device in a packet and send the packet to the control device. In some possible implementations, the candidate device may send a packet to the control device based on NETCONF or SNMP.

After obtaining a plurality of pieces of reference information, the control device may select the first network device from the plurality of candidate devices based on the reference information of each candidate device in the plurality of candidate devices. It can be learned from the foregoing description that the reference information may include a plurality of pieces of information about the candidate device. In this case, the control device may select a candidate device in which a piece of information in reference information is optimal as the first network device. For example, the control device may select a candidate device with a highest miss rate as the first network device. Certainly, the control device may further determine the first network device with reference to a plurality of pieces of information in the reference information.

An example is used for description. When the reference information includes the CPU idle rate of the candidate device, the memory idle rate of the candidate device, the bandwidth idle rate of the candidate device, the hop count between the candidate device and the control device, the maximum quantity of fragments supported by the candidate device, and the miss rate of the candidate device, the control device may calculate a comprehensive value of each candidate device based on the reference information. A formula for calculating the comprehensive value is as follows: The comprehensive value=(the CPU idle rate of the candidate device*20%+the memory idle rate of the candidate device*20%+the bandwidth idle rate of the candidate device*20%+the hop count between the candidate device and the control device*20%+the maximum quantity of fragments supported by the candidate device*20%)*the miss rate.

After obtaining the comprehensive value of each candidate device in the plurality of candidate devices through calculation, the control device may determine a candidate device with a highest comprehensive value as the first network device on the forwarding path. In this way, a working status of each network device in the network device group is considered, and possible impact of data packets on a load of the network device is also considered, thereby further improving sending efficiency of the data packets.

After determining the first network device on the forwarding path, the control device may further determine the forwarding path of the data packet group based on the first network device and network topology information of other network devices in the network device group. Optionally, the forwarding path may include the first network device and a shortest path from the first network device to the other network devices in the network device group. In this case, when determining the forwarding path, the control device may determine the forwarding path based on hop counts among the network devices in the network device group. For example, the control device may select, from the network device group, a network device with a smallest hop count from the first network device as a second network device on the forwarding path, to determine a sequence of the network devices in the network device group on the forwarding path in sequence.

By using FIG. 1 as an example, the following describes a process in which the control device generates correspondences and determines a first network device. It is assumed that the network device 121 needs the data packet M, the data packet N, the data packet X, and a data packet Y; the network device 122 needs the data packet M, the data packet N, and the data packet Y; the network device 123 needs the data packet M, the data packet N, and the data packet X; and the network device 124 needs the data packet X, the data packet N, and the data packet Y.

When generating correspondences, the control device 110 may group the data packet M and the data packet N into a data packet group A1, group the data packet X into a data packet group B1, and group the data packet Y into a data packet group C1. In this case, a network device group A2 corresponding to the data packet group A1 includes the network device 121, the network device 122, the network device 123, and the network device 124; a network device group B2 corresponding to the data packet group B1 includes the network device 121 and the network device 123; and a network device group C2 corresponding to the data packet group C1 includes the network device 121, the network device 122, and the network device 124.

After generating the correspondences, the control device 110 may separately determine a forwarding path corresponding to each network device group. For example, when determining a forwarding path corresponding to the data packet group A1, the control device 110 may determine the network device 121 as a first network device on the forwarding path. However, when determining a forwarding path corresponding to the data packet group B1, because the hop count between the network device 121 and the control device 110 is 1 and is less than the hop count 2 between the network device 123 and the control device 110, the control device 110 may determine the network device 121 as a first network device. When determining a forwarding path of the data packet group C1, because a hop count between the network device 121 and the control device 110 is the same as a hop count between the network device 122 and the control device 110 and the network device 121 has been used as the first network device on the forwarding path of the data packet group B1, the control device 110 may determine the network device 122 as a first network device on the forwarding path of the data packet group C1.

After determining a forwarding path of a data packet group, the control device may send the data packet group to a first network device on the forwarding path, and then the first network device sends data packets to other network devices on the forwarding path, so that each network device in the network device group can receive the required data packet group.

In some possible implementations, a network device in a network device group may not be connected to other network devices in the network device group. In this case, to implement normal transmission of packets, a forwarding path may include other network devices other than the network device group. Such network devices other than the network device group are referred to as transit network devices, to forward a data packet group. For actions performed by the transit network devices after receiving the data packet group, refer to description of S205. Details are not described herein again.

The following uses an example in which the control device sends a first data packet group to a first network device group corresponding to the first data packet group for description.

S204: The control device sends the first data packet group and information about a forwarding path to a first network device on the forwarding path of the first data packet group.

After determining the forwarding path of the first data packet group, the control device may send the first data packet group and the information about the forwarding path to the first network device on the forwarding path. The following separately describes sending a first data packet group and sending the information about the forwarding path by the control device.

A method for sending a first data packet by the control device is first described.

In this embodiment of the present disclosure, the control device may send the first data packet group to the first network device based on an FTP or SFTP. Before sending the first data packet group, the control device may first notify all network devices in the network device group to deploy a file transfer protocol such as the FTP or the SFTP.

Optionally, when sending the first data packet group, the control device may first send an identifier of each data packet in the first data packet group to the first network device. After receiving identifiers of such data packets, the first network device may download the first data packet group from the control device.

In some possible implementations, the control device may fragment one or more data packets included in the first data packet group, and then send data packets obtained after the fragmentation to the first network device. Specifically, the control device may fragment the first data packet group into a plurality of first data packet subgroups, and each first data packet subgroup corresponds to one data packet in the first data packet group. For example, the control device may split, based on a preset length, each data packet in the first data packet group into one or more data packets whose lengths are less than the preset length. Then, the control device may send the plurality of first data packet subgroups to the first network device in sequence or in parallel. In this way, a larger data packet is split into a plurality of smaller data packets for sending, thereby improving transmission efficiency of the data packet.

An example is used for description. It is assumed that the first data packet group includes a data packet M, a size of the data packet M is 15 kilobytes (kB), and a length of each data packet obtained after fragmentation is not greater than 10 kB. In this case, the control device may split the data packet M into a data packet M1 whose size is 10 kB and a data packet M2 whose size is 5 kB. In other words, a first data packet subgroup corresponding to the data packet M includes the data packet M1 and the data packet M2. In this case, when sending the first data packet subgroup to the first network device, the control device may first send the data packet M1, and then send the data packet M2. The control device may also send the data packet M1 and the data packet M2 simultaneously (namely, in parallel).

The following describes a method for sending the information about the forwarding path by the control device.

In this embodiment of the present disclosure, the information about the forwarding path may reflect, in the network system, a network device to which the first network device needs to send the first data packet. The control device sends the information about the forwarding path to the first network device based on PCEP. Before sending the information about the forwarding path, the control device may first notify all network devices in the network device group to deploy a protocol such as the PCEP.

The information about the forwarding path sent by the control device to the first network device may include only information about a next-hop network device of the first network device, or may include information about the entire forwarding path. The following describes the two cases respectively.

In a first possible implementation, the information about the forwarding path includes only the information about the next-hop network device of the first network device. In other words, the control device sends only the information about the next-hop network device of the first network device to the first network device, and does not send information about other network devices on the forwarding path. The next-hop network device is a network device that is on the forwarding path and that directly receives the first data packet group sent by the first network device. After receiving the information about the next-hop network device, the first network device may send the first data packet group to the next-hop network device based on the information about the next-hop network device. Optionally, in addition to the information about the next-hop network device, the control device may further send, to a network device, information about a previous network device of the network device and/or information about the first network device.

In this embodiment of the present disclosure, the information about the next-hop network device includes any one or more of information such as an IP address of the next-hop network device, a label of the next-hop network device, and a segment identifier (SID) of the next-hop network device.

When the information about the forwarding path sent by the control device to the first network device includes only the information about the next-hop network device of the first network device and does not include information about other network devices on the forwarding path, to ensure normal forwarding of the first data packet group among network devices in the first network device group, the control device may send the information about the forwarding path to other network devices other than the first network device on a forwarding path. Optionally, the information about the forwarding path sent by the control device to a network device in the first network device group may include information about a next-hop network device of the network device.

FIG. 1 is still used as an example for description. It is assumed that the first network device group includes the network device 121, the network device 122, the network device 123, and the network device 124, the control device 110 determines the network device 121 as the first network device, and the forwarding path is that the network device 121 sends the first data packet group to the network device 122 and the network device 123, and the network device 122 sends the first data packet group to the network device 124. In this case, the control device 110 may send IP addresses of the network device 122 and the network device 123 to the network device 121, and send an IP address of the network device 124 to the network device 122.

Optionally, the control device may further send fragment information to network devices on the forwarding path group. The fragment information may include to-be-fragmented file names, a fragment sending manner, and a total quantity of fragments. For description of related content such as fragmentation, refer to the foregoing description. Details are not described herein again.

In this embodiment of the present disclosure, in addition to the information about the previous network device and the information about the next-hop network device, the control device may further send corresponding role information to the network devices on the forwarding path. Role information of a network device indicates a function played by the network device on the forwarding path. For example, roles such as a first network device and a transit network device may be included. Correspondingly, after receiving the role information sent by the control device, the network device may perform a corresponding action based on the role information. For example, it is assumed that the role information received by the network device is the transit network device. In this case, after receiving the first data packet group, the network device may not cache the first data packet group, but directly send the first data packet group to a next-hop network device.

In a second possible implementation, the information about the forwarding path includes the information about the entire forwarding path. In other words, the control device sends, to the first network device, information about each network device and information about a next-hop network device of the network device on the entire forwarding path. In this case, after receiving the information about the forwarding path, the first network device may determine, based on the information about the forwarding path, a next-hop network device corresponding to the first network device, to send the first data packet group to the next-hop network device.

When the control device sends the information about the entire forwarding path to the first network device, the control device may not send the information about the forwarding path to other devices in the first network device group. In this case, to ensure normal forwarding of the first data packet group among network devices in the first network device group, the first network device may send the information about the forwarding path to the next-hop network device, so that the next-hop network device sends the first data packet group to a network device on the forwarding path based on the information about the forwarding path. For detailed description of this part, refer to the following. Details are not described herein again.

S205: The first network device copies the first data packet group to obtain a second data packet group.

It can be learned from the foregoing description that the forwarding path may include a network device in the network device group and a transit network device. When the first network device on the forwarding path is a transit network device, the first network device may not cache the first data packet group, but directly send the first data packet group to the next-hop network device based on the information about the forwarding path.

When the first network device on the forwarding path is a network device in the network device group, the first network device may store the first data packet group after receiving the first data packet group, for example, may cache the first data packet group, to update software or an application that has been installed based on the first data packet group, or install new software or a new application by using the first data packet group. After caching the first data packet group, the first network device may copy the first data packet group to obtain the second data packet group. Optionally, the second data packet group and the first data packet group may be the same.

In this embodiment of the present disclosure, the control device may fragment the first data packet group. In this case, when the first network device on the forwarding path is a network device in the network device group and the first network device receives the first data packet group transmitted in fragments, the first network device may reassemble data packet groups received after the fragmentation into the entire first data packet group, to update software or an application that has been installed based on the first data packet group, or install new software or a new application by using the first data packet group.

S206: The first network device sends the second data packet group to the next-hop network device based on the information about the forwarding path.

After obtaining the second data packet group, the first network device may send the second data packet group to the next-hop network device based on the information about the forwarding path. Optionally, the first network device may send the second data packet group to the next-hop network device based on the FTP or the SFTP.

It can be learned from the foregoing description that, the information about the forwarding path sent by the control device to the first network device may include only the information about the next-hop network device of the first network device, or may include the information about the entire forwarding path. Correspondingly, based on different information about the forwarding path sent by the control device, the first network device may determine the second data packet group in different manners before sending the second data packet group. The following describes separately.

In a first possible implementation, the information about the forwarding path sent by the control device to the first network device includes only the information about the next-hop network device of the first network device. In this case, before sending the second data packet group, the first network device may first determine the next-hop network device based on the information about the forwarding path, to send the second data packet group to the next-hop network device.

In a second possible implementation, the information about the forwarding path sent by the control device to the first network device may include the information about the entire forwarding path. In this case, before sending the second data packet group, the first network device may first search, based on information about the first network device (for example, an IP address of the first network device and a label of the first network device), for the information about the next-hop network device corresponding to the first network device from the information about the entire forwarding path, that is, first determine the information about the next-hop network device of the first network device from the information about the entire forwarding path.

To ensure normal transmission of the data packet group in the network device group, the first network device may further send the information about the forwarding path to the next-hop network device. In this way, the next-hop network device may determine, based on the information about the forwarding path, information about a next-hop device corresponding to the next-hop network device, to send the data packet group to a correct network device. Optionally, before sending the information about the forwarding path, the first network device may further delete the information about the first network device from the information about the forwarding path, thereby reducing an amount of data that needs to be sent, and improving transmission efficiency of data packets.

In this embodiment of the present disclosure, to facilitate transmission of the data packet group, the first network device may fragment the second data packet group before sending the second data packet group, group the second data packet into a plurality of second data packet subgroups, and then send the second data packet subgroups to the next-hop network device in sequence or in parallel based on the forwarding path. For description of fragmenting the data packet group, refer to the description of S204. Details are not described herein again.

After the next-hop network device of the first network device receives the second data packet group, the next-hop network device may determine, based on the information about the forwarding path, whether the next-hop network device has a next-hop network device on the forwarding path, that is, whether the network device needs to send the data packet group to another network device. If needed, the next-hop network device may copy the second data packet group, and send a new data packet group obtained by copying to the another network device. In the process, for an action performed by the next-hop network device, refer to description of S205 and S206. Details are not described herein again.

Optionally, after all network devices in the network device group receive the data packet group required by the network device group, the control device may notify the network devices in the network device group to stop sending the data packet group and start to upgrade software or update an application.

FIG. 1 is still used as an example for description. It is assumed that the first network device group includes the network device 121, the network device 122, and the network device 123, the first network device on the forwarding path is the network device 121, the next-hop network device of the first network device is the network device 122, and a next-hop network device of the network device 122 is the network device 123. In this case, the control device 110 may send the first data packet group to the network device 121, and separately send information about respective next-hop network devices to the network device 121, the network device 122, and the network device 123. After receiving the first data packet group, the network device 121 may copy the first data packet group to obtain the second data packet group, and send the second data packet group to the network device 122 based on information about the next-hop network device (namely, the network device 122). After receiving the second data packet group, the network device 122 may copy the second data packet group to obtain a third data packet group, and send the third data packet group to the network device 123 based on information about the next-hop network device (namely, the network device 123). Because the forwarding path does not have a next-hop network device of the network device 123, the network device 123 may not send the data packet group to another network device after receiving the third data packet group.

It can be learned that, in the data packet sending method provided in this embodiment of the present disclosure, a control device may first obtain a data packet set required by each network device in a plurality of network devices, and then determine a plurality of network device groups based on different required data packets, to obtain correspondences between data packet groups and the network device groups. After obtaining the correspondence, the control device may send a data packet group corresponding to a network device group to network devices in the network device group, so that the network devices can receive data packets required by the network devices. In addition, after receiving the data packet group, a first network device in the network device group may send the data packet group to other network devices in the network device group based on a forwarding path determined by the control device, so that each network device in the network device group can receive required data packets. In this way, the control device may determine, in an upgrade task, data packets required by each network device, and specify data packets that need to be obtained by each network device, to send data packets required by different network devices respectively to the different network devices, so that the network devices update software or an application based on the data packets required by the network devices respectively.

On a basis of the embodiment shown in FIG. 1, the following uses an example in which the control device 110 sends a data packet M, a data packet N, a data packet X, and a data packet Y to the network device 121; sends the data packet M, the data packet N, and the data packet Y to the network device 122; sends the data packet M, the data packet N, and the data packet X to the network device 123; and sends the data packet X, the data packet N, and the data packet Y to the network device 124 for description.

After determining data packets required by each network device, the control device 110 may determine correspondences between data packet groups and network device groups. For example, the control device 110 may group the data packet M and the data packet N into a data packet group A1, group the data packet X into a data packet group B1, and group the data packet Y into a data packet group C1. In this case, a network device group A2 corresponding to the data packet group A1 includes the network device 121, the network device 122, the network device 123, and the network device 124; a network device group B2 corresponding to the data packet group B1 includes the network device 121 and the network device 123; and a network device group C2 corresponding to the data packet group C1 includes the network device 121, the network device 122, and the network device 124.

Then, the control device 110 may determine that a first network device on a forwarding path corresponding to the data packet group A1 is the network device 121, next-hop network devices of the network device 121 are the network device 122 and the network device 123, and a next-hop network device of the network device 123 is the network device 124. The control device 110 may also determine that a first network device on a forwarding path corresponding to the data packet group B1 is the network device 121, and a next-hop network device of the network device 121 is the network device 123. The control device 110 may also determine that a first network device on a forwarding path corresponding to the data packet group C1 is the network device 122, and next-hop network devices of the network device 121 are the network device 121 and the network device 124.

Then, the control device may send the data packet M, the data packet N, and the data packet X to the network device 121, send the data packet Y to the network device 122, and send information about the forwarding path to each network device in the network system.

Figure 3:
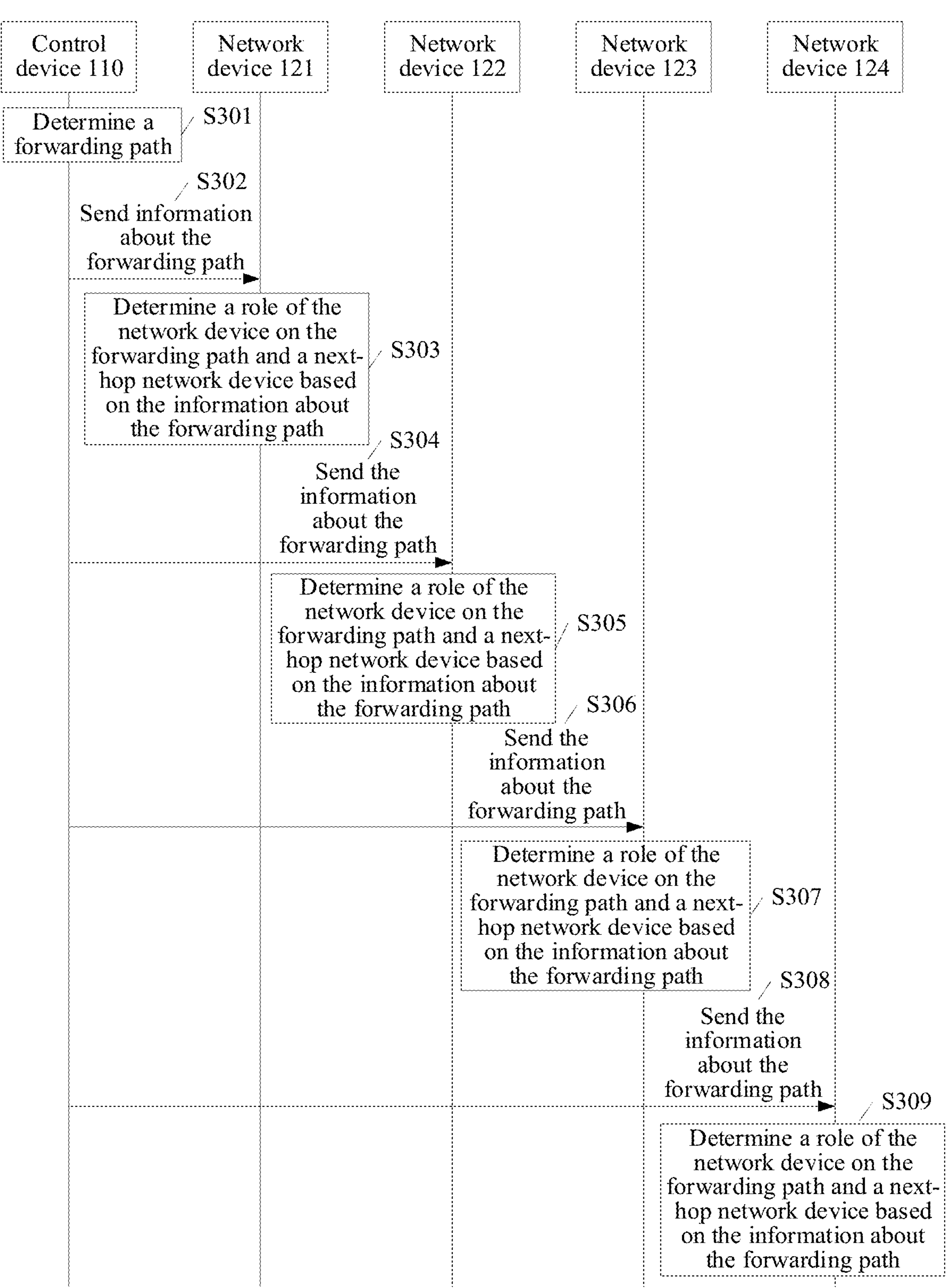
FIG. 3 is a diagram of signaling interaction of a data packet sending method according to an embodiment of the present disclosure.

An example in which the control device sends the data packet group A1 and information about the corresponding forwarding path to network devices in the network system is used for description. FIG. 3 is a schematic diagram of interaction of a data packet sending method according to an embodiment of the present disclosure. The method includes the following steps.

S301: A control device 110 determines a forwarding path of a data packet group A1.

S302: The control device 110 sends information about the forwarding path to a network device 121.

The information about the forwarding path sent by the control device 110 to the network device 121 may include IP addresses of a network device 122 and a network device 123, and reflect that a role of the network device 121 on the forwarding path is a first network device.

S303: The network device 121 determines the role of the network device on the forwarding path and a next-hop network device based on the information about the forwarding path.

After receiving the information about the forwarding path, the network device 121 may determine, based on the information about the forwarding path, that the role of the network device 121 on the forwarding path is the first network device, and determine that the next-hop network device of the network device 121 is the network device 122 and the network device 123.

S304: The control device 110 sends the information about the forwarding path to the network device 122.

The information about the forwarding path sent by the control device 110 to the network device 122 may reflect that a role of the network device 122 on the forwarding path is an intermediate device.

S305: The network device 122 determines the role of the network device on the forwarding path and a next-hop network device based on the information about the forwarding path.

After receiving the information about the forwarding path, the network device 122 may determine, based on the information about the forwarding path, that the role of the network device 122 on the forwarding path is the intermediate device, and determine that the forwarding path does not include the next-hop network device of the network device 122.

S306: The control device 110 sends the information about the forwarding path to the network device 123.

The information about the forwarding path sent by the control device 110 to the network device 123 may include an IP address of a network device 124, and reflect that a role of the network device 123 on the forwarding path is an intermediate device.

S307: The network device 123 determines the role of the network device on the forwarding path and a next-hop network device based on the information about the forwarding path.

After receiving the information about the forwarding path, the network device 123 may determine, based on the information about the forwarding path, that the role of the network device 123 on the forwarding path is the intermediate device, and determine that a next-hop network device of the network device 123 is the network device 124.

S308: The control device 110 sends the information about the forwarding path to the network device 124.

The information about the forwarding path sent by the control device 110 to the network device 121 may include IP addresses of a network device 122 and a network device 123, and reflect that a role of the network device 121 on the forwarding path is a first network device.

S309: The network device 124 determines the role of the network device on the forwarding path and a next-hop network device based on the information about the forwarding path.

After receiving the information about the forwarding path, the network device 124 may determine, based on the information about the forwarding path, that the role of the network device 124 on the forwarding path is the intermediate device, and determine that the forwarding path does not include the next-hop network device of the network device 124.

The following uses a transmission process of the data packet M in the data packet group A1 in the network system as an example for description.

Figure 4:
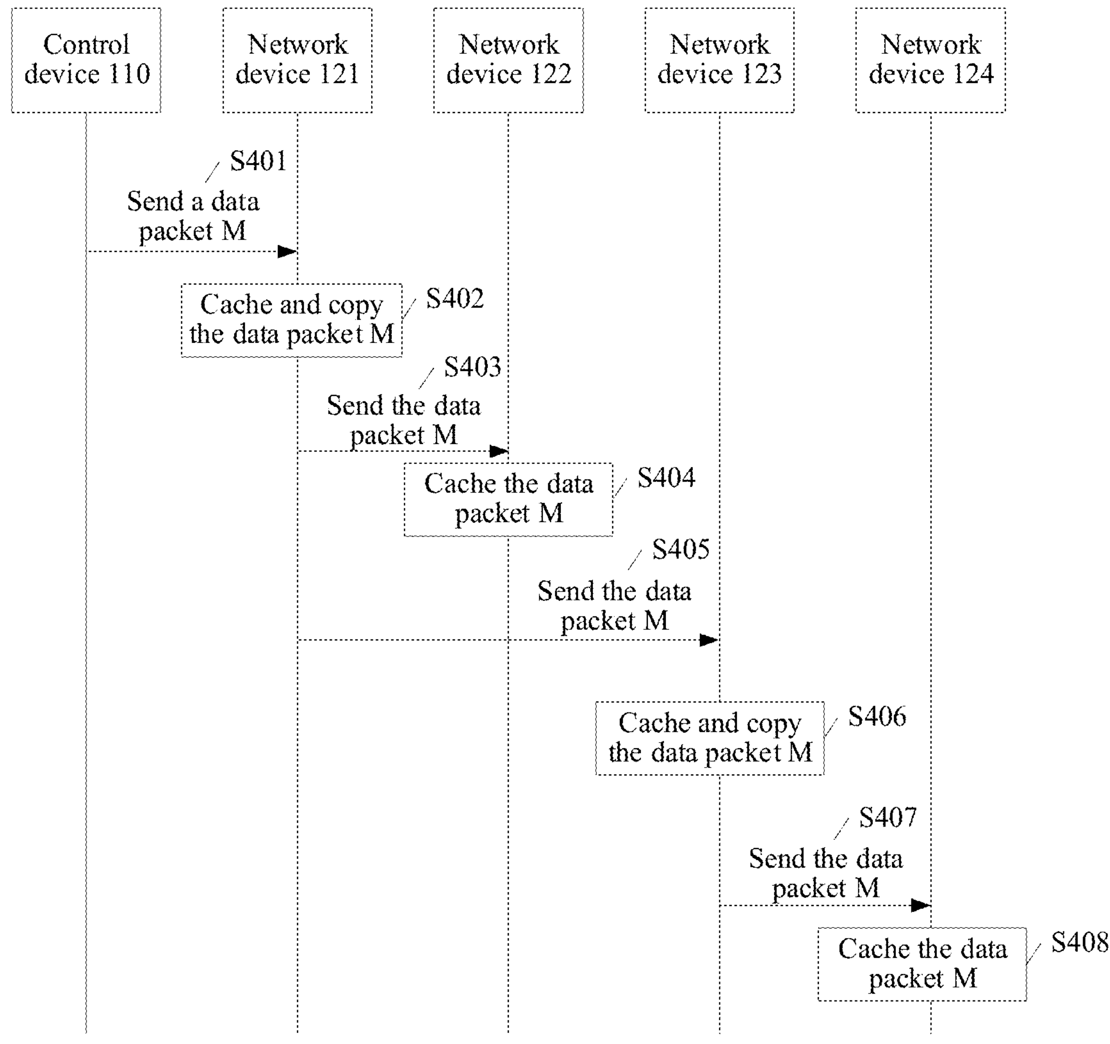
FIG. 4 is a diagram of signaling interaction of a data packet sending method according to an embodiment of the present disclosure.

FIG. 4 is a schematic diagram of interaction of a data packet sending method according to an embodiment of the present disclosure. The method includes the following steps.

S401: A control device 110 sends a data packet M to a network device 121.

S402: The network device 121 caches and copies the data packet M.

The network device 121 is a first network device on a forwarding path, the forwarding path has a next-hop network device of the network device 121, and the network device 121 is not a transit network device. Therefore, the network device 121 may cache the data packet M to subsequently update software or an application, and copy the data packet M to send to other network devices.

S403: The network device 121 sends the data packet M to a network device 122.

If the network device 121 may determine, based on information about the forwarding path, that the network device 122 is the next-hop network device of the network device 121, the network device 121 may send the data packet M to the network device 122.

S404: The network device 122 caches the data packet M.

Because the network device 122 is not a transit network device and the forwarding path does not have a next-hop network device of the network device 122, the network device 122 may cache the data packet M, and does not copy the data packet M.

S405: The network device 121 sends the data packet M to a network device 123.

It should be noted that, S403 may be performed before S405, or S403 may be performed after S405, or S403 and S405 may be performed in parallel.

S406: The network device 123 caches and copies the data packet M.

Because the network device 123 is not a transit network device and a next-hop network device of the network device 123 on the forwarding path is a network device 124, the network device 122 may cache the data packet M, and copy the data packet M.

S407: The network device 123 sends the data packet M to the network device 124.

S408: The network device 124 caches the data packet M.

Figure 5:
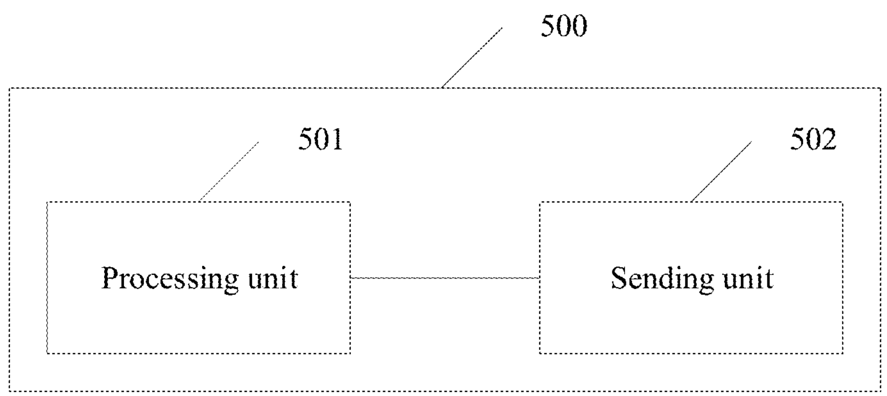
FIG. 5 is a schematic diagram of a structure of a control device according to an embodiment of the present disclosure.

FIG. 5 is a schematic diagram of a possible structure of a device in the foregoing embodiments. A control device 500 may implement functions of the control device in the example shown in FIG. 2. Refer to FIG. 5. The control device 500 includes: a processing unit 501 and a sending unit 502. Such units may perform corresponding functions of the control device in the foregoing method example. The processing unit 501 is configured to support the device 500 in performing S201, S202, and S203 in FIG. 2. The sending unit 503 is configured to support the device 500 in performing S204 in FIG. 2. For example, the processing unit 501 is determine a data packet set corresponding to each network device in a plurality of network devices, where the data packet set includes one or more data packets that need to be used by the corresponding network device, and data packet sets corresponding to the plurality of network devices are not entirely the same; and generate a plurality of correspondences based on the data packet sets of the plurality of network devices, where the correspondence is a correspondence between a data packet group and a network device group, the network device group includes one or more network devices in the plurality of network devices, and the data packet group includes data packets that need to be used by all network devices in the network device group; and the sending unit 502 is configured to send the corresponding data packet group to the network devices in the network device group based on the correspondence. For a specific execution process, refer to detailed description of corresponding steps in the embodiment shown in FIG. 2.

Figure 6:
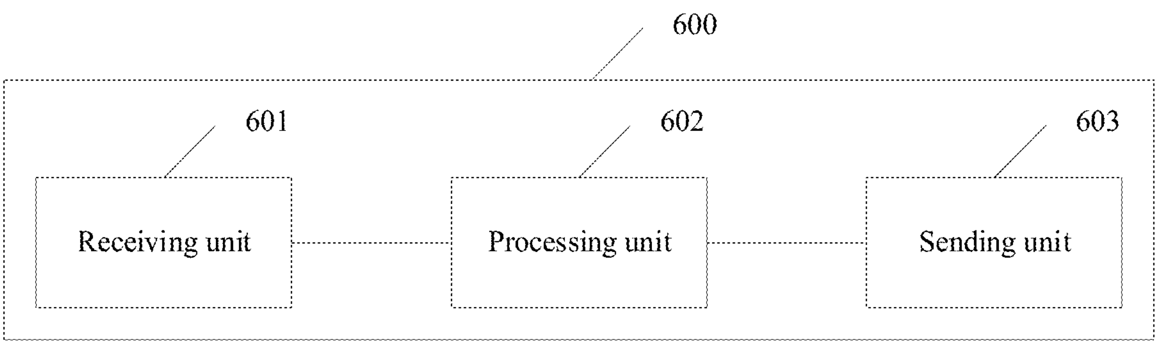
FIG. 6 is a schematic diagram of a structure of a network device according to an embodiment of the present disclosure.

FIG. 6 is a schematic diagram of a possible structure of a network device in the foregoing embodiments. A network device 600 may implement functions of the network device in the example shown in FIG. 2. Refer to FIG. 6. The network device 600 includes: a receiving unit 601, a processing unit 602, and a sending unit 603. Such units may perform corresponding functions of the network device in the foregoing method example. The receiving unit 601 is configured to support the network device 600 in receiving information about a forwarding path and a first data packet group that are sent by a control device. The processing unit 602 is configured to support the network device 600 in performing S205 in FIG. 2. The sending unit 603 is configured to support the device 600 in performing S206 in FIG. 2. Such units may perform the corresponding functions of the network device in the foregoing method example. For example, the receiving unit 601 is configured to receive a first data packet group from a first device, and obtain information about a forwarding path of the first data packet group, where the information about the forwarding path indicates that a next-hop network device of a first network device is a second network device, and the first data packet group includes one or more data packets; the processing unit 602 is configured to copy the first data packet group to obtain a second data packet group; and the sending unit 603 is configured to send the second data packet group to the second network device based on the information about the forwarding path. For a specific execution process, refer to detailed description of corresponding steps in the embodiment shown in FIG. 2.

It should be noted that, in embodiments of the present disclosure, unit division is an example, and is merely a logical function division. In actual implementation, another division manner may be used. Functional units in embodiments of the present disclosure may be integrated into one processing unit, or each of the units may exist alone physically, or two or more units are integrated into one unit. For example, in the foregoing embodiments, the obtaining unit and the processing unit may be a same unit or different units. The integrated unit may be implemented in a form of hardware, or may be implemented in a form of a software functional unit.

Figure 7:
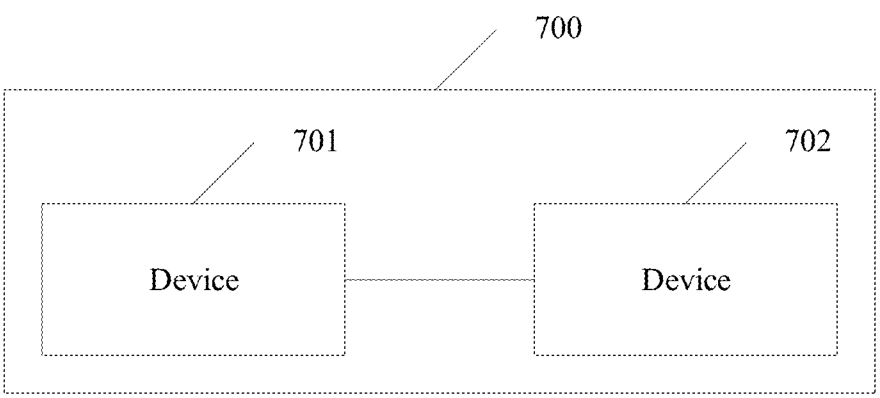
FIG. 7 is a schematic diagram of a structure of a network system according to an embodiment of the present disclosure.

Refer to FIG. 7. An embodiment of the present disclosure provides a network system 700. The system 700 is configured to implement the data packet sending method provided in the foregoing method embodiments. The system 700 includes a device 701 and a device 702. The device 701 may implement function of the control device in the embodiment shown in FIG. 2, and the device 702 may implement functions of the network device in the embodiment shown in FIG. 2. For a specific execution process, refer to detailed description of corresponding steps in the embodiment shown in FIG. 2.

Figure 8:
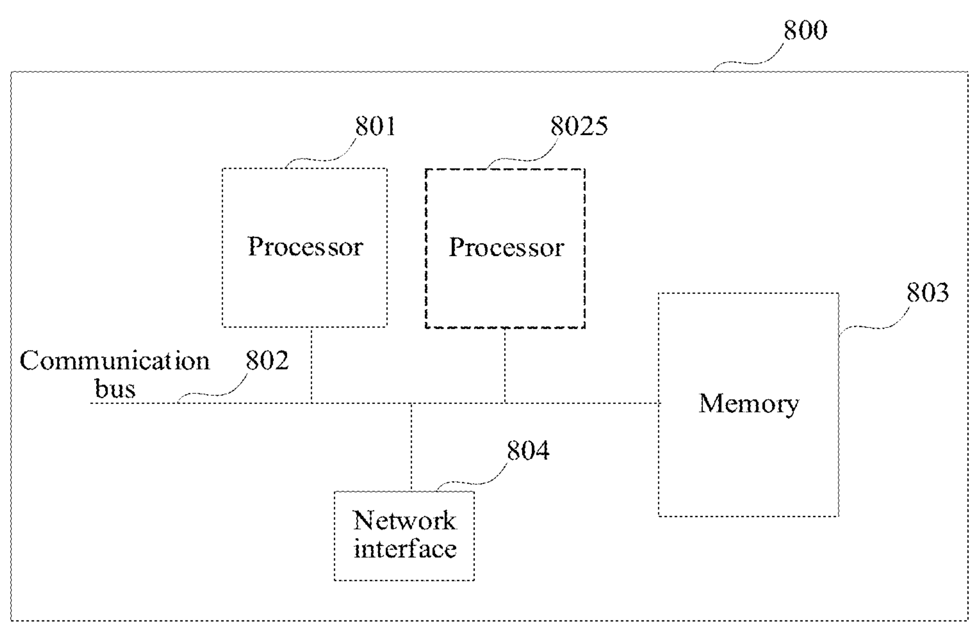
FIG. 8 is a schematic diagram of a structure of a device according to an embodiment of the present disclosure.

FIG. 8 is a schematic diagram of a structure of a device 800 according to an embodiment of the present disclosure. The control device 500 in FIG. 5 and the network device 600 in FIG. 6 may be implemented by using the device shown in FIG. 8. Refer to FIG. 8. The device 800 includes at least one processor 801, a communication bus 802, and at least one network interface 804. Optionally, the device 800 may further include a memory 803.

The processor 801 may be a general-purpose CPU, an application-specific integrated circuit (ASIC), or one or more integrated circuits (ICs) configured to control program execution of solutions of the present disclosure. The processor may be configured to process a packet, to implement a packet forwarding method and a packet processing method provided in embodiments of the present disclosure. For example, when the control device in FIG. 2 is implemented by using the device shown in FIG. 8, the processor may be configured to determine a data packet set corresponding to each network device in a plurality of network devices, where the data packet set includes one or more data packets that need to be used by the corresponding network device, and data packet sets corresponding to the plurality of network devices are not entirely the same; generate a plurality of correspondences based on the data packet sets of the plurality of network devices, where the correspondence is a correspondence between a data packet group and a network device group, the network device group includes one or more network devices in the plurality of network devices, and the data packet group includes data packets that need to be used by all network devices in the network device group; and send the corresponding data packet group to the network devices in the network device group based on the correspondence. For another example, when the network device in FIG. 2 is implemented by using the device shown in FIG.

8, the processor may be configured to receive a first data packet group from a first device, and obtain information about a forwarding path of the first data packet group, where the information about the forwarding path indicates that a next-hop network device of a first network device is a second network device, and the first data packet group includes one or more data packets; copy the first data packet group to obtain a second data packet group; and send the second data packet group to the second network device based on the information about the forwarding path. For specific function implementation, refer to description of the method embodiments.

The communication bus 802 is configured to transfer information among the processor 801, the network interface 804, and the memory 803.

The memory 803 may be a read-only memory (ROM) or another type of static storage device that may store static information and instructions. The memory 803 may alternatively be a random-access memory (RAM) or another type of dynamic storage device that may store information and instructions, or may be a compact disc read-only memory (CD-ROM) or another optical disc storage, an optical disc storage (including a compact disc, a laser disc, an optical disc, a digital versatile disc, a Blu-ray disc, and the like), a disk storage medium or another magnetic storage device, or any other medium that can be configured to carry or store expected program code in a form of instructions or a data structure and can be accessed by a computer. However, the memory 803 is not limited thereto. The memory 803 may exist independently, and is connected to the processor 801 through the communication bus 802. Alternatively, the memory 803 may be integrated with the processor 801.

Optionally, the memory 803 is configured to store program code or instructions for executing the solutions of the present disclosure, and the processor 801 controls the execution. The processor 801 is configured to execute the program code or the instructions stored in the memory 803. The program code may include one or more software modules. Optionally, the processor 801 may alternatively store the program code or the instructions for executing the solutions of the present disclosure. In this case, the processor 801 does not need to read the program code or the instructions from the memory 803.

The network interface 804 may be an apparatus such as a transceiver, and is configured to communicate with another device or a communication network. The communication network may be an Ethernet, a radio access network (RAN), a wireless local area network (WLAN), or the like. In this embodiment of the present disclosure, the network interface 804 may be configured to receive a packet sent by another node in a segment routing network, or send a packet to another node in the segment routing network. The network interface 804 may be an Ethernet interface, a fast Ethernet (FE) interface, a gigabit Ethernet (GE) interface, or the like.

In specific implementation, in an embodiment, the device 800 may include a plurality of processors, for example, the processor 801 and a processor 8025 shown in FIG. 8. Each of such processors may be a single-core processor (single-CPU), or may be a multi-core processor (multi-CPU). The processor herein may be one or more devices, circuits, and/or processing cores configured to process data (for example, computer program instructions).

Figure 9:
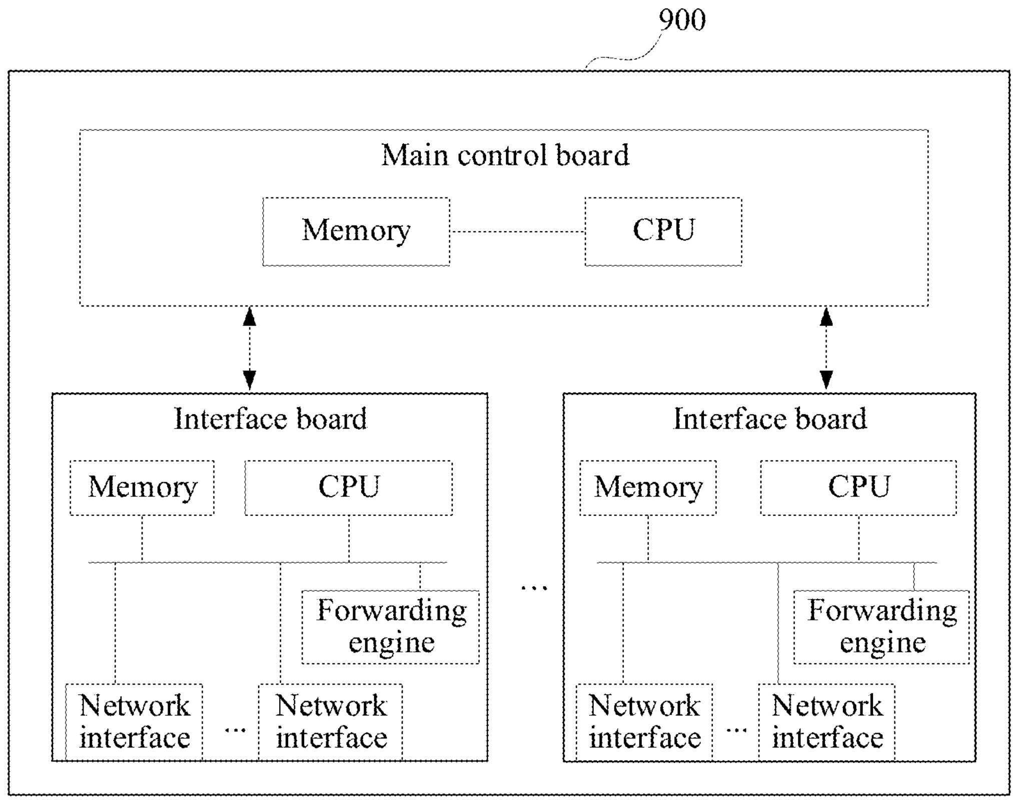
FIG. 9 is a schematic diagram of a structure of a device according to an embodiment of the present disclosure.

FIG. 9 is a schematic diagram of a structure of a device 900 according to an embodiment of the present disclosure. The control device and the network device in FIG. 2 may be implemented by using the device shown in FIG. 9. Refer to the schematic diagram of the structure of the device shown in FIG. 9. The device 900 includes a main control board and one or more interface boards. The main control board is communicatively connected to the interface board. The main control board is also referred to as a main processing unit (MPU) or a route processor card. The main control board includes a CPU and a memory, and is responsible for controlling and managing each component in the device 900, including route computation, and device management and maintenance functions. The interface board is also referred to as a line processing unit (LPU) or a line card, and is configured to receive and send a packet. In some embodiments, the main control board communicates with the interface board or the interface board communicates with the interface board through a bus. In some embodiments, the interface boards communicate with each other through a switching board. In this case, the device 900 also includes a switching board. The switching board is communicatively connected to the main control board and the interface boards, and is configured to forward data between the interface boards. The switching board may also be referred to as a switch fabric unit (SFU). The interface board includes a CPU, a memory, a forwarding engine, and an interface card (IC). The interface card may include one or more network interfaces. The network interface may be an Ethernet interface, an FE interface, a GE interface, or the like. The CPU is communicatively connected to the memory, the forwarding engine, and the interface card. The memory is configured to store a forwarding table. The forwarding engine is configured to forward a received packet based on the forwarding table stored in the memory. If a destination address of the received packet is an IP address of the device 900, the forwarding engine sends the packet to the CPU of the main control board or the CPU of the interface board for processing. If the destination address of the received packet is not the IP address of the device 900, the forwarding engine searches the forwarding table based on the destination address. If a next hop and an outbound interface that correspond to the destination address are found from the forwarding table, the forwarding engine forwards the packet to the outbound interface corresponding to the destination address. The forwarding engine may be a network processor (NP). The interface card, also referred to as a subcard, may be installed on the interface board. The interface card is responsible for converting an optical/electrical signal into a data frame, checking validity of the data frame, and forwarding the data frame to the forwarding engine for processing or the CPU of the interface board. In some embodiments, the CPU may also perform a function of the forwarding engine, for example, implementing software forwarding based on a general-purpose CPU, so that no forwarding engine is required in the interface board. In some embodiments, the forwarding engine may be implemented by using an ASIC or a field-programmable gate array (FPGA). In some embodiments, the memory that stores the forwarding table may alternatively be integrated in the forwarding engine, and is used as a part of the forwarding engine.

An embodiment of the present disclosure further provides a chip system, including a processor. The processor is coupled to a memory, and the memory is configured to store a program or instructions. When the program or the instructions is/are executed by the processor, the chip system is enabled to implement the method for a control device or a network device in the embodiment shown in FIG. 2.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in the present disclosure. For example, the memory may be a non-transitory processor, for example, a ROM. The memory and the processor may be integrated into a same chip, or may be separately disposed on different chips. A type of the memory and a manner of disposing the memory and the processor are not specifically limited in the present disclosure.

For example, the chip system may be an FPGA, an ASIC, a system-on-chip (SoC), a CPU, an NP, a digital signal processor (DSP), a micro controller unit (MCU), a programmable logic device (PLD), or another integrated chip.

It should be understood that the steps in the foregoing method embodiments may be completed by using a hardware integrated logic circuit or instructions in a form of software in the processor. The steps of the methods disclosed with reference to embodiments of the present disclosure may be directly performed by a hardware processor, or may be performed by a combination of hardware in the processor and a software module.

An embodiment of the present disclosure further provides a computer-readable storage medium, including instructions. When the instructions are run on a computer, the computer is enabled to perform the method in the foregoing embodiments.

In the specification, claims, and accompanying drawings of the present disclosure, the terms "first", "second", "third", "fourth", and the like are intended to distinguish between similar objects but do not necessarily indicate a specific order or sequence. It should be understood that the data termed in such a way is interchangeable in proper circumstances so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In the present disclosure, "at least one" refers to one or more, and "a plurality of" refers to two or more. At least one of the following items (pieces) or a similar expression thereof refers to any combination of these items, including any combination of singular items (pieces) or plural items (pieces). For example, at least one of a, b, or c may represent: a, b, c, a-b, a-c, b-c, or a-b-c, where a, b, and c may be single or plural. In the present disclosure, it is considered that "A and/or B" includes A alone, B alone, and A+B.

It may be clearly understood by a person skilled in the art that, for convenient and brief description, for a detailed working process of the foregoing system, apparatus, and unit, refer to a corresponding process in the foregoing method embodiments.

In several embodiments provided in the present disclosure, it should be understood that the disclosed system, apparatus, and method may be implemented in other manners. For example, the described apparatus embodiments are merely examples. For example, unit division is merely logical module division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be obtained based on actual requirements to achieve the objectives of the solutions of embodiments.

In addition, module units in embodiments of the present disclosure may be integrated into one processing unit, or each of the units may exist alone physically, or two or more units are integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions of the present disclosure essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of the present disclosure. The foregoing storage medium includes: any medium that can store program code, such as a USB flash drive, a removable hard disk, a ROM, a RAM, a magnetic disk, or an optical disc.

A person skilled in the art should be aware that in the foregoing one or more examples, functions described in the present disclosure may be implemented by hardware, software, firmware, or any combination thereof. When the functions are implemented by using software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or dedicated computer.

The objectives, technical solutions, and beneficial effects of the present disclosure are further described in detail in the foregoing specific implementations. It should be understood that the foregoing descriptions are merely specific implementations of the present disclosure.

The foregoing embodiments are merely intended for describing the technical solutions of the present disclosure, but not for limiting the present disclosure. Although the present disclosure is described in detail with reference to the foregoing embodiments, it should be appreciated by a person skilled in the art that, modifications may still be made to the technical solutions described in the foregoing embodiments, or equivalent replacements may be made to the part of the technical features; without departing from the scope of the technical solutions of embodiments of the present disclosure.

What is claimed is:

1. A method, implemented by a control device, the method comprising:

determining update requirements for each network device of a plurality of network devices, wherein the network device is a router, a switch, or a device that implements a virtual router or a virtual switch, and wherein the update requirements comprise at least one of updating a software version of a currently installed software, patching the currently installed software, or installing a new software application on the network device;

determining update data packets corresponding to the update requirements for each network device;

grouping the update data packets into data packet sets, wherein different data packet sets comprise different update data packets for performing different updates;

grouping network devices in the plurality of network devices into network device groups based on the update requirements for each network device, wherein each network device in a network device group requires a same update;

generating a plurality of correspondences between the data packet sets and the network device groups based on the update requirements of each network device group and the different updates associated with each data packet set; and sending, based on a first correspondence of the plurality of correspondences, a first data packet set of the data packet sets to a first network device group of the network device groups.

2. The method of claim 1, further comprising:

determining a forwarding path of the first data packet set based on network topology information of the plurality of network devices in the first network device group; and sending forwarding information about the forwarding path and the first data packet set to a first network device on the forwarding path, wherein the forwarding information is for forwarding the first data packet set.

3. The method of claim 2, wherein determining the forwarding path comprises:

determining one or more network devices in the first network device group as one or more candidate devices based on hop counts between the one or more network devices and the control device;

determining the first network device from the one or more candidate devices; and determining the forwarding path based on the first network device and the network topology information of other network devices in the first network device group.

4. The method of claim 3, further comprising:

obtaining reference information of each candidate device; and determining the first network device from the one or more candidate devices based on the reference information.

5. The method of claim 4, wherein obtaining the reference information of each candidate device comprises receiving a packet of each candidate device, wherein the packet is based on a Network Configuration Protocol (NETCONF) or based on a Simple Network Management Protocol (SNMP), and wherein the packet carries the reference information.

6. The method of claim 4, wherein the reference information comprises one or more of the following: performance information of a network device, a hop count from the control device, a maximum quantity of supported fragments, or a miss rate, and wherein the miss rate is a probability that the network device is not selected as the first network device.

7. The method of claim 4, wherein the reference information comprises a central processing unit (CPU) idle rate of the candidate device, a memory idle rate of the candidate device, a bandwidth idle rate of the candidate device, a hop count between the candidate device and the control device, a maximum quantity of fragments supported by the candidate device, and a miss rate of the candidate device, wherein the miss rate is a probability that the candidate device is not selected as the first network device.

8. The method of claim 7, further comprising calculating a comprehensive value of each candidate device based on the reference information, and wherein determining the first network device from the one or more candidate devices based on the reference information comprises determining the first network device from the one or more candidate devices based on the comprehensive value of each candidate device.

9. The method of claim 8, wherein the comprehensive value=(the CPU idle rate of the candidate device*20%+the memory idle rate of the candidate device*20%+the bandwidth idle rate of the candidate device*20%+the hop count between the candidate device and the control device*20%+the maximum quantity of fragments supported by the candidate device*20%)*the miss rate.

10. The method of claim 2, wherein the forwarding information is for forwarding the first data packet set to a next-hop network device on the forwarding path.

11. The method of claim 2, further comprising sending the forwarding information to other network devices on the forwarding path.

12. The method of claim 2, wherein sending the forwarding information to the first network device on the forwarding path comprises sending the forwarding information to the first network device based on a Path Computation Element Protocol (PCEP).

13. The method of claim 2, wherein the forwarding information comprises an Internet Protocol (IP) address of a next-hop network device, a label of the next-hop network device, or a segment identifier of the next-hop network device.

14. A control device comprising:

one or more memories configured to store instructions;

one or more processors coupled to the one or more memories and configured to execute the instructions to cause the control device to:

determine update requirements for each network device of a plurality of network devices, wherein the network device is a router, a switch, or a device that implements a virtual router or a virtual switch, and wherein the update requirements comprise at least one of updating a software version of a currently installed software, patching the currently installed software, or installing a new software application on the network device;

determine update data packets corresponding to the update requirements for each network device;

group the update data packets into data packet sets, wherein different data packet sets comprise different update data packets for performing different updates;

group network devices in the plurality of network devices into network device groups based on the update requirements for each network device, wherein each network device in a network device group requires a same update;

generate a plurality of correspondences between the data packet sets and the network device groups based on the update requirements of each network device group and the different updates associated with each data packet set; and send, based on a first correspondence of the plurality of correspondences, a first data packet set of the data packet sets to a first network device group of the network device groups.

15. The control device of claim 14, wherein the one or more processors execute the instructions to cause the control device to:

determine a forwarding path of the first data packet set based on network topology information of the plurality of network devices in the first network device group; and send forwarding information about the forwarding path and the first data packet set to a first network device on the forwarding path, wherein the forwarding information is for forwarding the first data packet set.

16. The control device of claim 15, wherein the one or more processors execute instructions to cause the control device to:

determine one or more network devices in the first network device group as one or more candidate devices based on hop counts between the one or more network devices and the control device;

determine the first network device from the one or more candidate devices; and determine the forwarding path based on the first network device and the network topology information of other network devices in the first network device group.

17. The control device of claim 16, wherein when there is a plurality of candidate devices, determining the first network device from the one or more candidate devices comprises:

obtaining reference information of each candidate device in the plurality of candidate devices; and determining the first network device from the plurality of candidate devices based on the reference information.

18. The control device of claim 17, wherein the reference information comprises one or more of the following: performance information of a network device, a hop count from the control device, a maximum quantity of supported fragments, or a miss rate, and wherein the miss rate is a probability that the network device is not selected as the first network device.

19. A computer program product comprising computer-executable instructions that are stored on a non-transitory computer-readable storage medium and that, when executed by one or more processors of an apparatus, cause the apparatus to:

determine update requirements for each network device of a plurality of network devices, wherein the network device is a router, a switch, or a device that implements a virtual router or a virtual switch, and wherein the update requirements comprise at least one of updating a software version of a currently installed software, patching the currently installed software, or installing a new software application on the network device;

determine update data packets corresponding to the update requirements for each network device;

group the update data packets into data packet sets, wherein different data packet sets comprise different update data packets for performing different updates;

group network devices in the plurality of network devices into network device groups based on the update requirements for each network device, wherein each network device in a network device group requires a same update;

generate a plurality of correspondences between the data packet sets and the network device groups based on the update requirements of each network device group and the different updates associated with each data packet set; and send, based on a first correspondence of the plurality of correspondences, a first data packet set of the data packet sets to a first network device group of the network device groups.

20. The computer program product of claim 19, wherein the one or more processors are further configured to execute the computer-executable instructions to cause the apparatus to:

determine a forwarding path of the first data packet set based on network topology information of the plurality of network devices in the first network device group; and send forwarding information about the forwarding path and the first data packet set to a first network device on the forwarding path, wherein the forwarding information is for forwarding the first data packet set.

* * * * *